United States Patent [19]
Bhagwat et al.

[11] Patent Number: 5,875,103
[45] Date of Patent: Feb. 23, 1999

[54] FULL RANGE SOFT-SWITCHING DC-DC CONVERTER

[75] Inventors: Pradeep Madhav Bhagwat, Baltimore, Md.; Chadd Dial Justo, Jersey City, N.J.; Hamid Kashani, Ocean, N.J.; Harry J. Britton, South Toms River, N.J.; Atluri Rama Prasad, Fords, N.J.

[73] Assignee: Electronic Measurements, Inc., Neptune, N.J.

[21] Appl. No.: 577,628

[22] Filed: Dec. 22, 1995

[51] Int. Cl.⁶ .................................................. H02M 3/335
[52] U.S. Cl. ................................ 363/17; 363/65; 363/71; 363/98
[58] Field of Search .............................. 363/170, 24, 25, 363/26, 65, 71, 97, 98, 132, 134

[56] References Cited

U.S. PATENT DOCUMENTS

| | | | |
|---|---|---|---|
| 5,027,038 | 6/1991 | De Bijl et al. | 363/132 |
| 5,079,686 | 1/1992 | Vinciarelli | 363/15 |
| 5,097,196 | 3/1992 | Schoneman | 323/222 |
| 5,113,334 | 5/1992 | Tuson et al. | 363/25 |
| 5,126,931 | 6/1992 | Jitaru | 363/21 |
| 5,132,888 | 7/1992 | Lo et al. | 363/17 |
| 5,132,889 | 7/1992 | Hitchcock et al. | 363/17 |
| 5,140,283 | 8/1992 | Reed | 330/284 |
| 5,157,592 | 10/1992 | Walters | 363/17 |
| 5,166,869 | 11/1992 | Hesterman | 363/25 |
| 5,172,309 | 12/1992 | DeDoncker et al. | 363/132 |
| 5,221,887 | 6/1993 | Gulczynski | 323/285 |
| 5,235,502 | 8/1993 | Vinciarelli et al. | 363/20 |
| 5,245,520 | 9/1993 | Imbertson | 363/17 |
| 5,267,133 | 11/1993 | Motomura et al. | 363/21 |
| 5,274,543 | 12/1993 | Loftus, Jr. | 363/127 |
| 5,287,261 | 2/1994 | Ehsani | 363/124 |
| 5,291,382 | 3/1994 | Cohen | 363/16 |
| 5,291,384 | 3/1994 | Mammano et al. | 363/17 |
| 5,305,191 | 4/1994 | Loftus, Jr. | 363/17 |
| 5,438,498 | 8/1995 | Ingemi | 363/17 |
| 5,451,962 | 9/1995 | Steigerwald | 363/71 |
| 5,546,295 | 8/1996 | Prete | 363/98 |

*Primary Examiner*—Jeffrey L. Sterrett
*Attorney, Agent, or Firm*—Michaelson & Wallace; Peter L. Michaelson; John C. Pokotylo

[57] ABSTRACT

A soft-switching DC to DC power converter which minimizes switching losses from a no load condition to a full load condition while operating at fixed frequency. Output voltage control is achieved by controlling the phase angle between the two switching networks. High frequency transformer primaries are always excited with a square wave input voltage equal to $$\pm \frac{V_{in}}{2}.$$

The power converter can be implemented with a single transformer. Moreover, the switch voltage never increases the input DC voltage from no load to full load. The power converter can be used in both low voltage high current applications and high voltage low current applications.

18 Claims, 12 Drawing Sheets

FULL RANGE SOFT-SWITCHING DC-DC CONVERTER

BACKGROUND OF THE INVENTION

1. Field of Invention

The present invention generally concerns power conversion, and specifically concerns a fixed frequency DC to DC power converter operating with zero voltage switching (turn-on and turn-off) from a no load operation to a full load operation while electrically isolating the input stage from the output stage for safety and load voltage matching.

2. Description of the Prior Art

Power converters are used in numerous industrial and consumer applications to convert a first (input) DC voltage into a required (output) DC voltage. These power converters typically use on or more switching networks, known as inverters. Each of the inverters has one or more switching transistors for chopping the input DC voltage into a high frequency square wave. The high frequency square wave is then fed into a power isolation transformer where it is stepped up or down to a predetermined value. The resulting waveform is then rectified and filtered to produce the required DC output voltage.

A controller may be used to compare the output voltage to a desired (i.e., setpoint) output voltage and to adjust the gain of the inverter(s) based on the comparison until the actual output voltage is substantially equal to the desired (setpoint) voltage. The gain of an inverter may be defined as the ratio of the AC output voltage to the DC input voltage.

The controller adjusts the output voltage of the power converter by varying the switching frequency (i.e., frequency modulation) or duty cycle (i.e., pulse width modulation or PWM) of the control signals applied to the switching transistors of the switching network(s). In the PWM control scheme, a square wave pulse is generated to turn the switching transistor(s) on or off. By varying the width of the pulse with respect to a fixed wave period, the conduction time of the transistor can be increased or decreased, thereby regulating the output voltage. Typically, the generated pulses are derived from a square wave having a duty cycle below 50 percent, which allows a certain amount of "deadtime" to prevent simultaneous conduction (and consequent short circuiting) by multiple switching transistors of a switching network due to non-ideal (i.e., non-instantaneous) switch state transitions. A disadvantage of this type of duty cycle control (i.e., PWM) is that during the half load period, or when the duty cycle is less than 50 percent, the high frequency voltage across the primary winding of the transformer is undefined and depends upon the circuit topology. This may cause high frequency ringing and oscillations.

To overcome these disadvantages, a wide variety of circuit topologies have been devised to improve the power density and/or efficiency of power converters. Power density, measured in Watts per unit volume, is one of the most important considerations in high power DC to DC power converter design. Passive elements, such as inductors and transformers, can be reduced in size by increasing the frequency of the signals passing through these elements. Unfortunately, as the switching frequency increases, the performance of the power converter is limited by losses in the switching devices and by parasitic losses associated with components and circuit layout.

Transistor switching losses occur during the finite amount of time required to turn the transistor "on" or "off". The type of power converter described above is known as a "hard switching" power converter since the transistors are turned off and on regardless of the energy they must dissipate during the switching transition.

Under ideal switch-off (opening) conditions, the current through a transistor would instantaneously drop to zero while the voltage across the transistor would instantaneously jump to the DC Supply (input) voltage. Under ideal switch-on (closing) conditions, the voltage across the transistor would instantaneously drop to zero. Under these ideal conditions, the power dissipation ($P=iV$) during switching transitions would always be zero, since either the voltage or current would equal zero. However, transistors have finite (i.e., non-instantaneous) switch-on (closing) and switch-off (opening) times and maximum ratings for current and voltage changes over time ($di/dt$ and $dv/dt$, respectively). Switching losses in excess of the maximum ratings impair the reliability and performances of the transistor (due to heat generation, for example).

Since power converters typically have switching transistors connected in series with a transformer, the leakage inductance of the transformer is charged while the transistor is conducting. When the base or gate of the transistor receives a turn-off signal and the transistor begins to cease conduction (initiates opening), the voltage across the transistor begins to rise. Unfortunately, the current through the transistor is sustained by the collapsing field of the charged leakage inductance of the transformer. The switch-off (opening) switching interval losses are due to the temporal overlap of falling current through the transistor and rising voltage across the transistor. The average of this (switching) loss over multiple switching cycles can be two to four times as large as the power dissipated (due to parasitics) during the transistor conduction time. This switching loss is an AC power dissipation which increases as the switching frequency increases. During the switch-on interval (closing) of the transistor, the large instantaneous impedance of the transformer leakage inductance slows the current rise time and reduces the voltage across the transistor to close to zero.

One prior art method to reduce such switching losses and the associated stress to the switch is to use a "snubber circuit" connected across the transistor to keep the $dv/dt$ value within the maximum allowable rating of the transistor. For example, as shown in FIG. 1, an RCD (Resistor-Capacitor-Diode) snubber has a series connected resistor R and capacitor C coupled across the current carrying path of the transistor Q. A diode D is connected in parallel with the resistor and biased to conduct during transistor switch-off (open) when the leakage inductance of the transformer is releasing its energy as discussed above. During this switch-off transition, the capacitor C absorbs the leakage current of the inductor and the resistor R dissipates the energy that would otherwise be dissipated within the transistor. Upon transistor switch-on (closing), the charged capacitor C will release its stored energy as a current. Unfortunately, the RCD snubber does not reduce net switching losses. Instead, it merely shifts the power dissipation from the transistor Q to the snubber resistor R. Thus, the RCD snubber merely reduces switching stresses on the switch. Moreover the resistor R dissipating the power loss must be of sufficient size and power rating.

As with the RCD snubbers, prior art circuits for non-dissipatively snubbing switching transistors use a capacitor to slow the $dv/dt$ value of the switching transistor. However, the energy stored in the capacitor has to either be dissipated in the switch during turn-on or converted into electromagnetic energy in the form of stored current in an inductor. This stored current is later discharged back into the inverter's DC source. The non-dissipative snubber technique, while utilizing energy which would otherwise be lost, disadvantageously increases the design complexity and cost of the inverter by adding inductive elements to the circuit. In addition, use of these non-dissipative techniques in "totem-pole" circuits, such as half-bridge and full-bridge inverters for example, is not feasible because these circuits use more than one switching element and therefore need more inductors to implement the above concept.

Other prior art techniques used to decrease switching losses include Zero Voltage Switching (ZVS) and Zero Current Switching (ZCS) in which the transistors are only switched between their conducting (closed) and non-conducting (open) states when there is substantially zero voltage across (or current through) the transistor. An example of these techniques is the resonant power converter (series or parallel) (see FIG. 2), in which a resonant tank circuit having an inductive element L and capacitive element C is placed in series or in parallel with the output of the switching network(s) to form an underdamped circuit. Accordingly, the current through the transistors of the switching network has a sinusoidal waveshape and predictably falls to zero due to the natural (i.e., inherent) characteristics of the circuit, at which time the transistors may be safely switched off or on. The output of a resonant power converter is adjusted by varying the switching frequency of the switching network(s). Specifically, as the switching frequency approaches the resonant frequency of the resonant tank circuit, the gain of the power converter increases toward its maximum. Unfortunately, variable frequency control and operation necessitates a more complex filter design which results in increased cost and decreased reliability. Another disadvantage with resonant power converters is that they produce a sinusoidal wave output. As a consequence, with resonant power converters, relatively large passive components are required to form the resonant elements compared with the passive components of inverters having a square wave output. Specifically, to deliver the same amount of energy to the load, the magnitude of the peak current level of a sinusoidal current waveform must be greater than the peak current level of a square-shaped current waveform.

Soft switching power converters overcome the need for higher peak currents by utilizing predominantly square switching waveforms with resonant transitions. These power converters are characterized by intrinsic modes of operation which allow an automatic and lossless resetting of snubber elements by appropriately recirculating stored energy. The energy may be stored by the snubber elements or any of the parasitic elements, such as the leakage inductance or interwinding capacitance of the power transformer or the stored charge in any of the semiconductor devices. A ZVS soft switching converter will use purely capacitive snubbers while a ZCS soft switching converter will use purely inductive snubbers.

As shown in FIG. 3, a standard full bridge hard switching power converter with a transformer-coupled output may be modified to operate as a ZVS soft switching power converter by adding an individual control means to each switch of a switching network. In this mode of operation, each switching transistor ($Q_A$, $Q_B$, $Q_C$, $Q_D$) will be snubbed by a capacitor ($C_A$, $C_B$, $C_C$, $C_D$) and an anti-parallel diode ($D_A$, $D_B$, $D_C$, $D_D$). When either of the diagonal pairs of transistors of the bridge ($Q_A$ and $Q_D$, or $Q_B$ and $Q_C$) are conducting, current flows through the primary of the power transformer ($T_p$), charging the leakage inductance of the transformer and magnetically coupling power to the load. Between these "power" modes, the switching transitions are sequenced to allow the energy stored in the leakage inductance of the transformer to circulate to discharge the snubbing capacitors of the next transistors to be turned on. When these capacitors are discharged, the snubbing diodes become forward biased and the transistors may be turned on without significant switching stresses. The pulse width of the output of the power converter is adjusted by a controller (not shown) in response to the required output level.

If the output voltage is initially too high, the pulse width of the control signals applied to the switching transistors responsively decreases as the output voltage approaches (decreases to) the desired (setpoint) voltage. At low output levels, the pulse width may be very narrow, resulting in shorter pulses of charging current applied to the leakage inductance and correspondingly lower energy storage. ZVS is maintained only as long as the energy stored in the leakage inductance is greater than that required to discharge the snubbing capacitors of the next transistors to be turned on. Unfortunately, at low output levels, the energy stored in the leakage inductance may be insufficient to maintain ZVS (i.e., to discharge the snubbing capacitors of the next transistors to be turned on). Consequently, switching losses and possible transistor damage may occur.

To prevent this possible loss of ZVS at low output levels, prior art circuits inserted an additional inductor ($L_1$) in series with the transformer primary $T_p$ (see FIG. 4). This improvement provided additional energy storage and allowed ZVS operation at lower output power levels than before. Unfortunately, the series inductor added cost and only succeeded in lowering, not eliminating, the minimum output level for ZVS. That is, ZVS operation can not be maintained at no load conditions in the power converter of FIG. 4.

The energy stored in the transformer (and in the series inductor) leakage inductance during the power mode may also be increased by increasing the peak current through these elements during the power mode of operation. Unfortunately, increasing the primary current has several negative effects, including increasing the size of the primary conductor means and increasing $I^2R$ power losses.

In view of the above mentioned problems with existing DC to DC power converters, a need exists for a soft-switching DC to DC power converter which allows zero voltage switching (ZVS) from no load operation to full load operation. Such a power converter should operate at a fixed frequency above the audible range. The power converter should also minimize Radio Frequency Interference (RFI) and Electro-Magnetic Interference (EMI) without requiring complicated filtering and shielding.

SUMMARY OF THE INVENTION

The present invention substantially eliminates the problems associated with known DC to DC power converters by providing a converter having two soft-switching networks (see FIG. 5). Each network consists of a plurality of (e.g., two) switching elements and a power transformer. These switching elements are controllably operated to chop an input DC voltage into a pulsed voltage signal. A plurality of power transformers, one associated with each switching network, have a bi-directional current excited within its primary windings by the pulsed voltage signal from the associated switching network. The secondary windings of the plurality of power transformers are connected in series such that currents coupled to all the secondary windings are added to (when the direction of the current in each is the same), or subtracted from (when the direction of the current in each is opposed to the other), each other. A rectification and filtering means converts the summed currents of the secondary windings to an output DC voltage. A sensor may be provided to measure the output DC voltage and a controller may he provided to adjust the phase angle of the switching networks based on a comparison of the output voltage with the desired (set point) voltage. The controller adjusts the relative phase relationship of the two networks linearly between zero and 180 degrees, causing the summed current signal and the resulting DC output voltage to vary between a maximum and zero, respectively.

In a specific embodiment of the present invention, an input DC voltage source is presented to two soft-switching networks. The first switching network comprises two field effect transistors (MOSFETS) connected in series thereby defining a first switching junction at a node between them. Similarly, the second switching network comprises two field effect transistors (MOSFETS) connected in series thereby defining a switching junction at a node between them. Each MOSFET has an intrinsic anti-parallel diode and capacitor coupled from its source to its drain. A divider circuit comprising two capacitors connected in series, defining a junction at a node therebetween, is coupled across the input voltage source. A first transformer has its primary winding connected between the junction of the divider circuit and the switching junction of the first switching network. A second transformer has its primary winding connected between the junction of the divider circuit and the switching junction of the second switching network. A first inductor is coupled in parallel with the primary winding of the first transformer while a second inductor is coupled in parallel with the primary winding of the second transformer. The secondary windings of both transformers are connected in series. The secondary windings are coupled with an output (rectifying) circuit comprising two diodes and two inductors arranged in a known current doubling configuration. An output capacitor is used for filtering the DC output voltage, which is then applied to the load.

The voltage across MOSFETs is brought to zero by discharging the snubbing capacitance across the MOSFET using energy stored by the elements in the circuit, primarily the capacitive divider, the two inductors, and the leakage inductance of the transformers. Since the switching networks operate at a fixed frequency and duty cycle, the available energy stored in the parasitic elements is substantially constant. As such, the timing for MOSFET switch-on is constant and the control means is simplified.

The output may be regulated by phase modulating the two switching networks, such that the currents induced in the secondary windings of the two transformers are added to, or subtracted from, each other. When the switching networks operate 180° out of phase, the voltage output will be at its maximum. When the switching networks operate in phase, the voltage output voltage will be zero.

The circuit may be further optimized by dynamically controlling the phase difference of the switching networks such that the time between the discharge of the snubbing capacitor across a MOSFET and the turn-on of that MOSFET is minimized.

BRIEF DESCRIPTION OF THE DRAWINGS

The teachings of the present invention may be readily understood by considering the detailed description in conjunction with the following drawings.

DETAILED DESCRIPTION OF THE INVENTION

Figure 1:
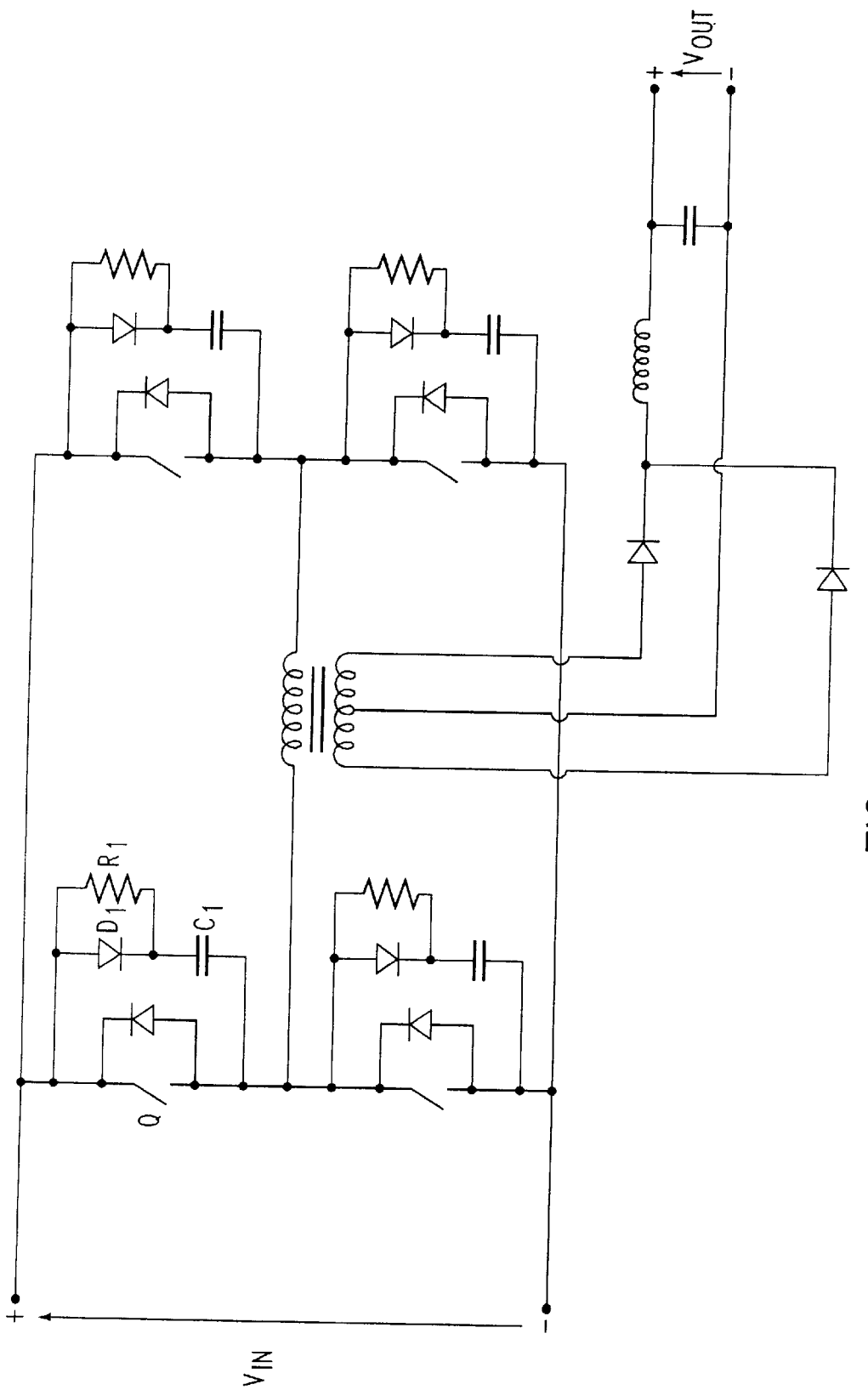
FIG. 1 is a schematic of a conventional soft-switching DC—DC converter utilizing RCD snubber circuits.
Figure 2:
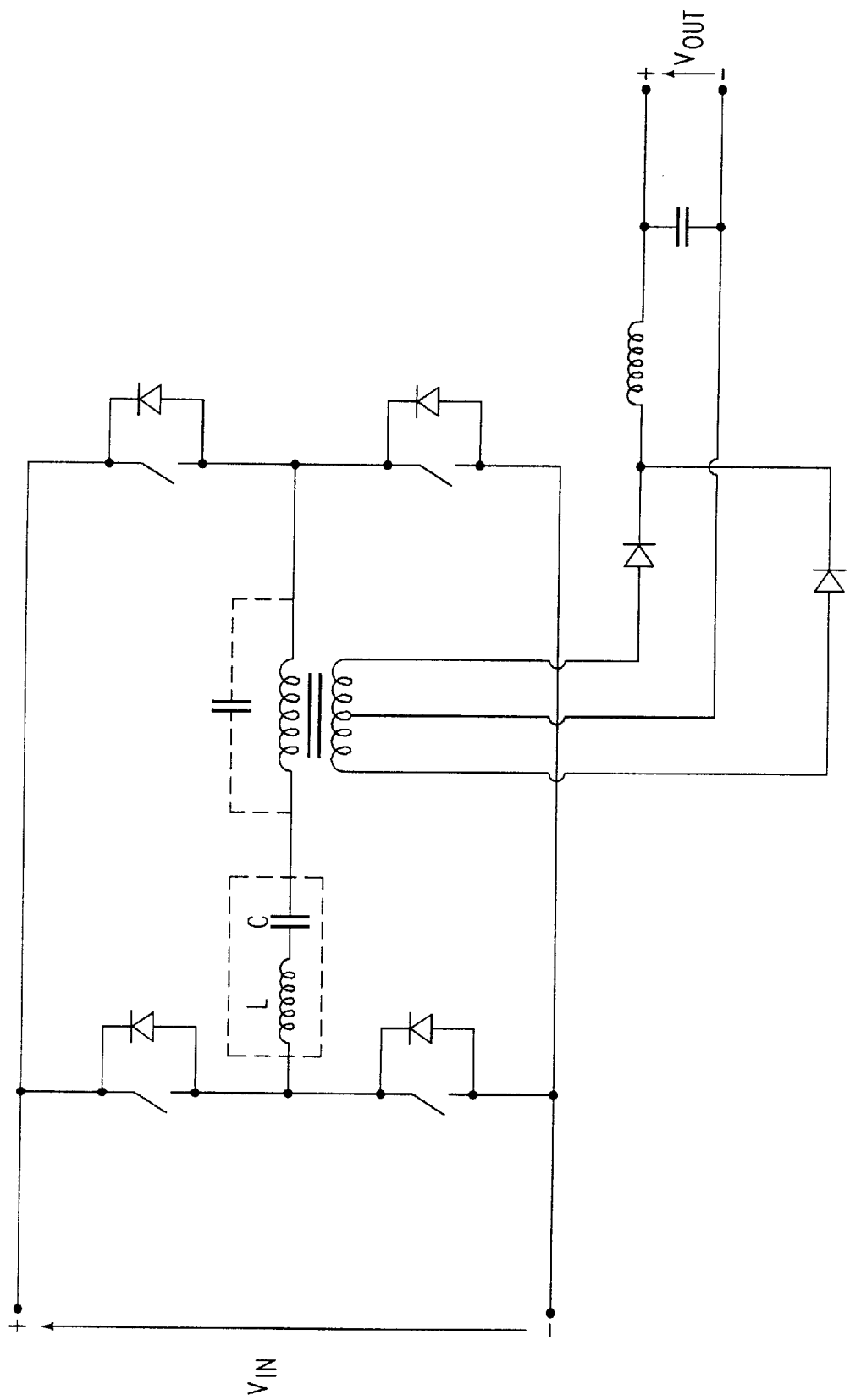
FIG. 2 is a schematic of a conventional resonant DC—DC converter.
Figure 3:
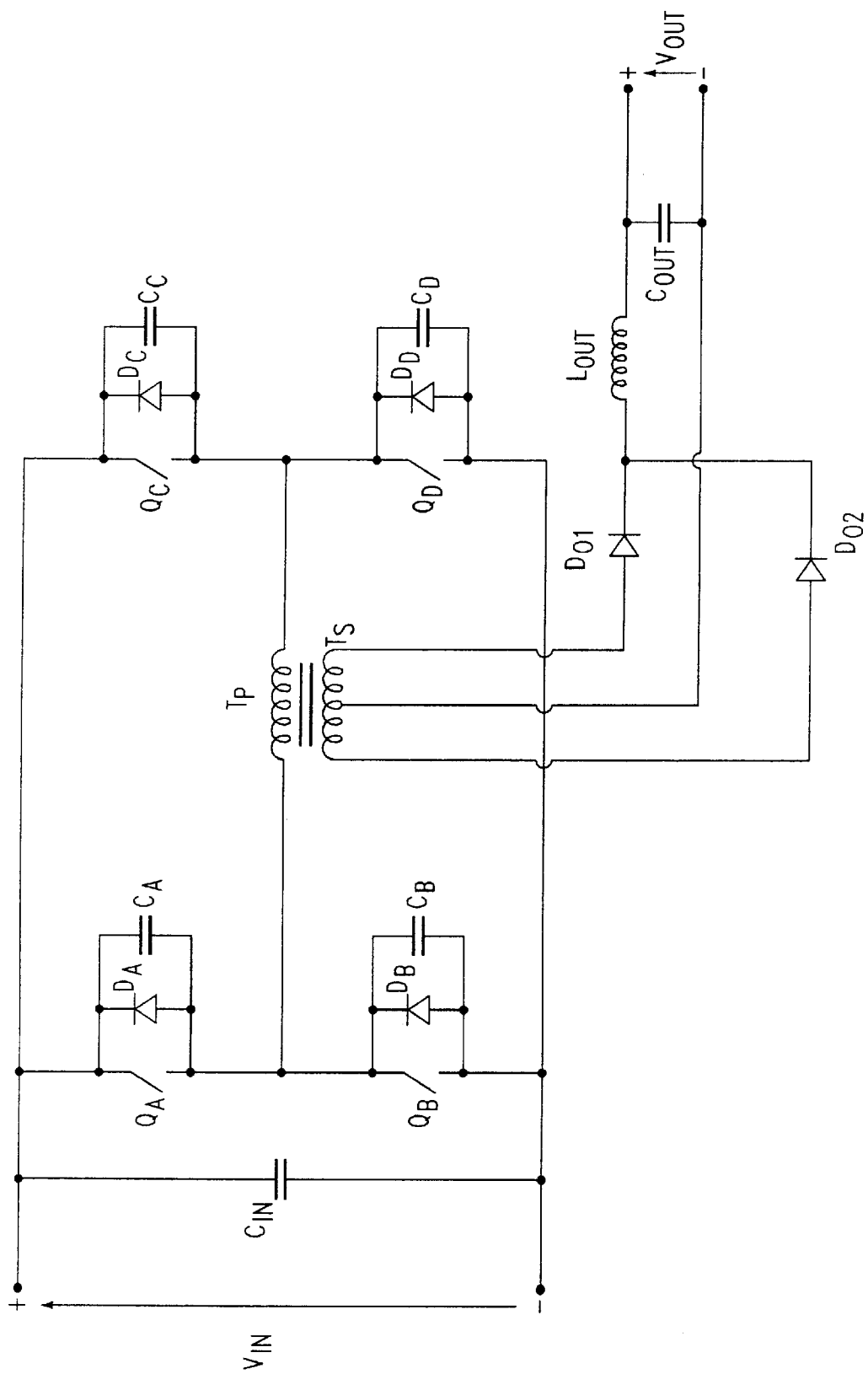
FIG. 3 is a conventional power converter having soft-switching at high output levels.
Figure 4:
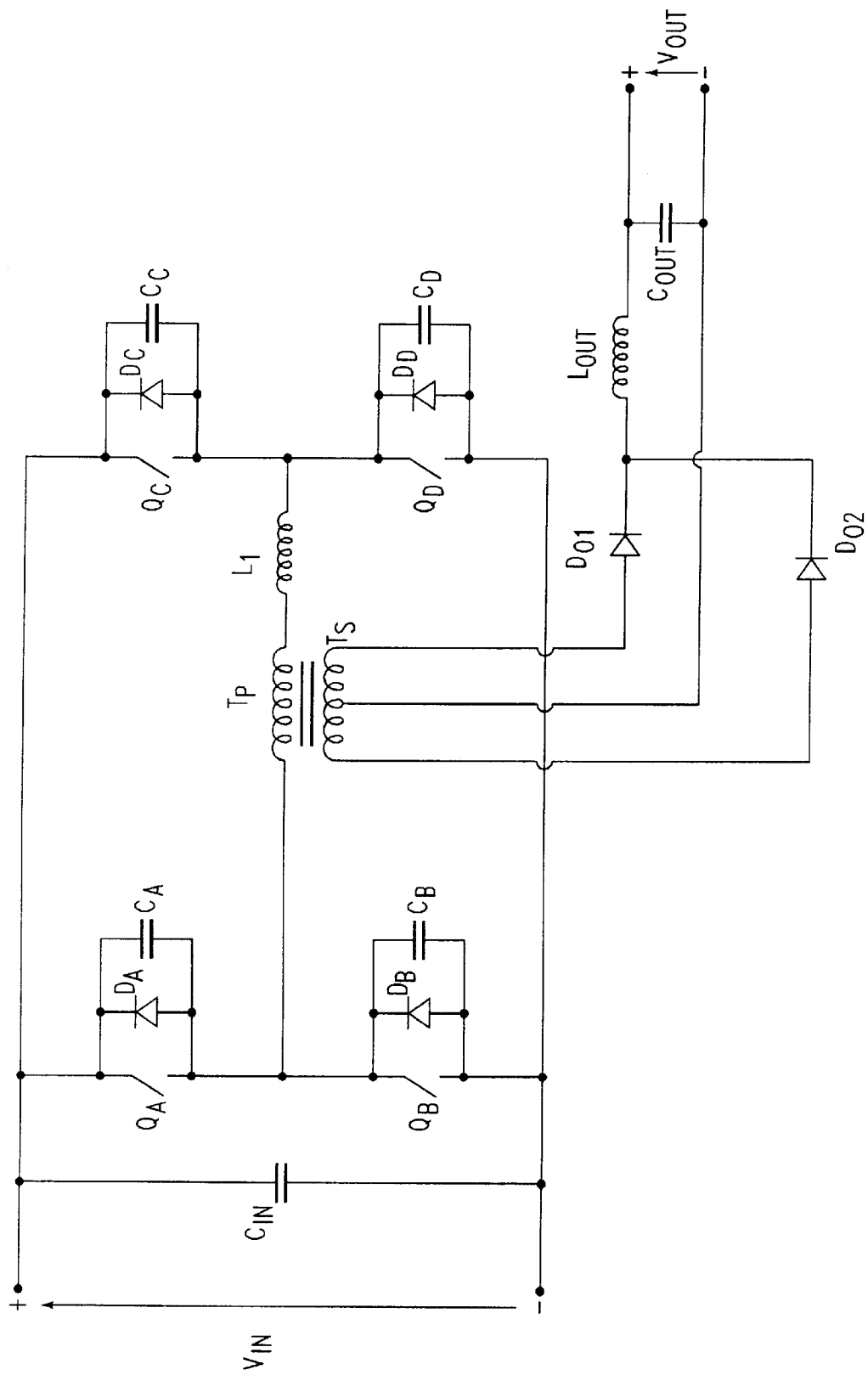
FIG. 4 is a schematic of an improvement of the DC—DC power converter of FIG. 3 in which soft-switching is attainable at lower output levels.
Figure 5:
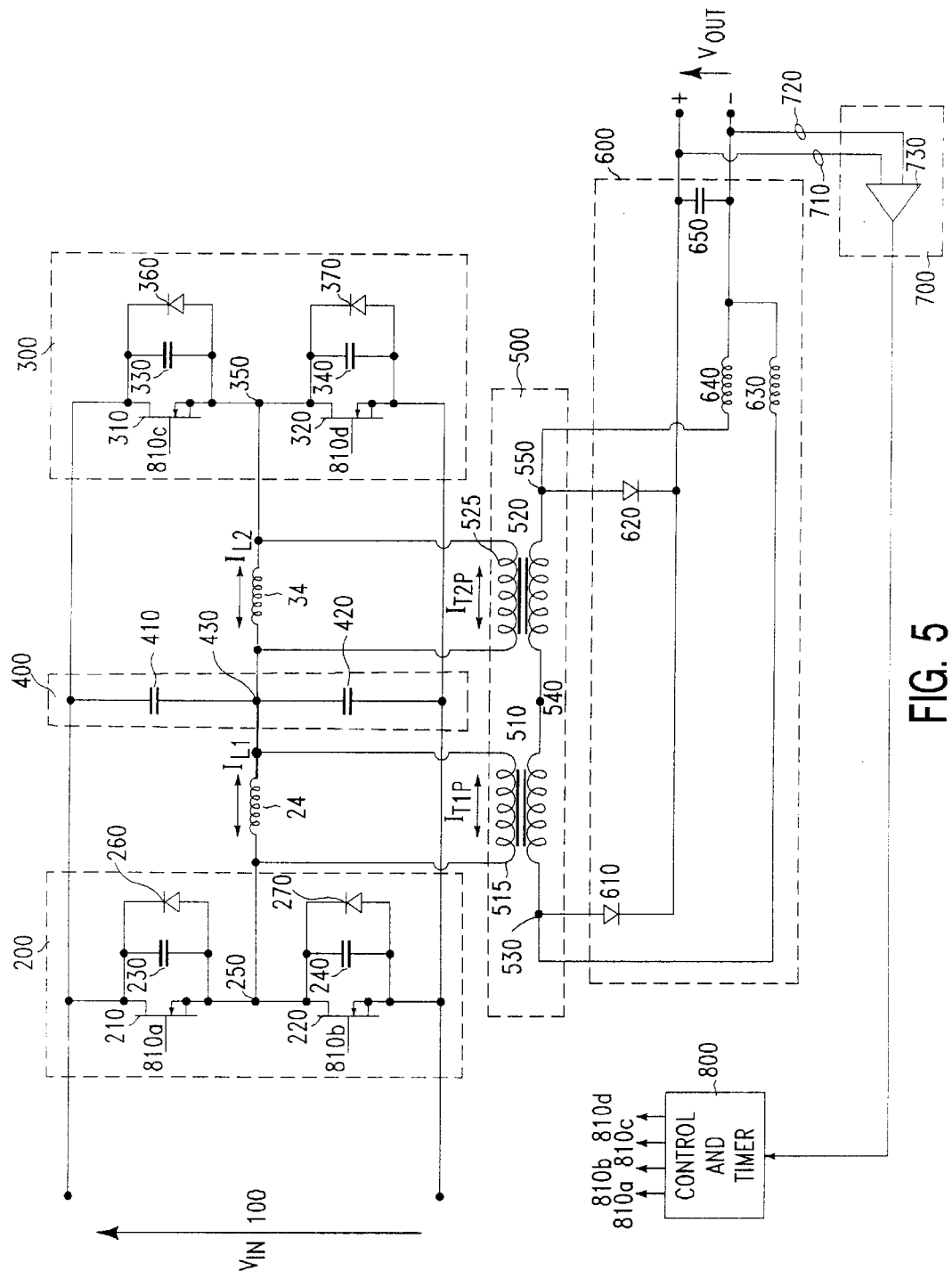
FIG. 5 is a schematic of a preferred embodiment of our full-range, soft-switching, phase modulated, DC—DC power converter.

FIG. 5 illustrates the preferred embodiment of our invention which comprises a first switching network 200 and a second switching network 300, each coupled with a DC input voltage source 100. The first switching network 200 may comprise a first MOSFET 210 and a second MOSFET 220 connected in series thereby defining a switching junction 250 at a node therebetween. A first snubbing capacitor 230 and a first intrinsic anti-parallel diode 260 are coupled from the source to the drain of the first MOSFET 210. Similarly, a second snubbing capacitor 240 and a second intrinsic anti-parallel diode 270 are coupled from the source to the drain of the second MOSFET 220. Similarly, the second switching network 300 may comprise a first MOSFET 310 and a second MOSFET 320 connected in series thereby defining a switching junction 350 at a node therebetween. A first snubbing capacitor 330 and a first intrinsic anti-parallel diode 360 are coupled from the source to the drain of the first MOSFET 310 of the second network 300. Similarly, a second snubbing capacitor 340 and a second intrinsic anti-parallel diode 370 are coupled from the source to the drain of the second MOSFET 320 of the second network 300. The intrinsic anti-parallel diodes connected across the MOSFETs are biased to allow current to flow from the source to the drain. Further, each MOSFET has a gate operable to control (i.e., enable or inhibit) source to drain current flow within the MOSFET.

Figure 10:
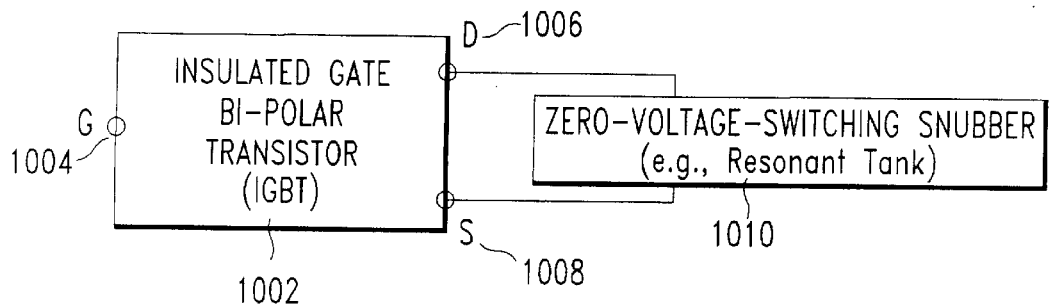
FIG. 10 is a block diagram of an insulated-gate bipolar transistor provided with a zero voltage switching snubber circuit.
Figure 11A:
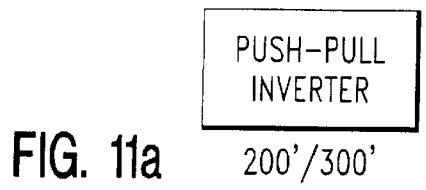
FIG. 11a through 11c illustrate various switching networks which may be used in the power converters of FIGS. 5 and 9.
Figure 11B:
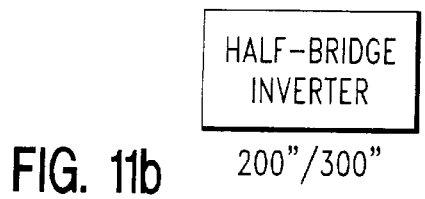
Figure 11C:
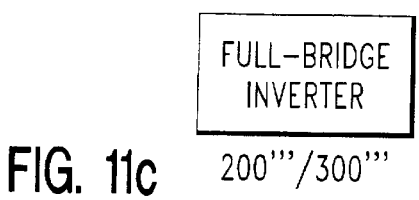

As shown in FIG. 10, a zero voltage switching snubber circuit (e.g., a resonant tank circuit) 1010 may be provided across a drain 1006 and a source 1008 of an insulated-gate bipolar transistor (or "IGBT") 1002. As shown in FIG. 11*a*, the first and/or second switching networks 200'/300' may be push-pull inverters. As shown in FIG. 11*b*, the first and/or second switching networks 200"/300" may be half-bridge inverters. Finally, as shown in FIG. 11*c*, the first and/or second switching networks 200'"/300'" may be full-bridge inverters.

As shown in FIG. 5, a voltage divider circuit 400 is coupled across the DC input voltage 100. The voltage divider circuit 400 comprises a first capacitor 410 and a second capacitor 420 connected in series, thereby defining a junction 430 at a node there between. A first inductor 24 is coupled between the switching junction 250 of the first switching network 200 and the node 430 of the voltage divider 400. A second inductor 34 is coupled between the switching junction 350 of the second switching network 300 and the node 430 of the voltage divider 400. A first transformer 510 has its primary winding 515 connected between the junction 430 of the divider circuit 400 and the switching junction 250 of the first switching network 200. A second transformer 520 has its primary winding 525 connected between the junction 430 of the divider circuit 400 and the switching junction 350 of the second switching network 300. The secondary windings of the first transformer 510 and the second transformer 520 are connected in series thereby defining a summing junction 540 at a node therebetween. The unconnected ends of the secondaries of the first and second transformers 510 and 520, respectively, define first and second terminal nodes 530 and 550, respectively. The first transformer 510 and the second transformer 520 are substantially identical.

The operation of the our power converter is explained with reference to FIGS. 6(*a*) through 6(*h*), 7(*a*) through 7(*i*), and 8(*a*) through 8(*c*). As explained earlier, the output voltage (V$_o$) is controlled by controlling the relative phase (φ) between switching signals of the two switching networks (200 and 300). The operation of our power converter is explained first at full load, at a half load, and then at no load. As will be evident from the description below, during the entire operational range from no load to full load, zero voltage turn-off and turn-on is realized in our power converter.

Operation at Full Load (Switching Networks 180 Degrees Out-Of-Phase)

Referring to FIG. 5, it is assumed that the voltage across capacitor 410 and capacitor 420 is fairly constant and that each of the capacitors 410 and 420 is charged at $$\frac{V_{in}}{2}.$$

Figure 6A:
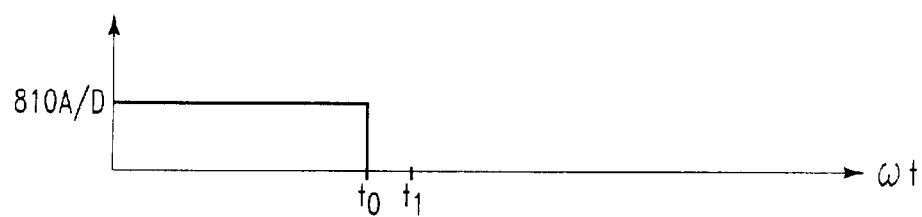
FIGS. 6(a) through 6(i) are timing diagrams which illustrate the operation of our power converter of FIG. 5 during full load operation where the phase difference between the two switching networks is 180 degrees.
Figure 6B:
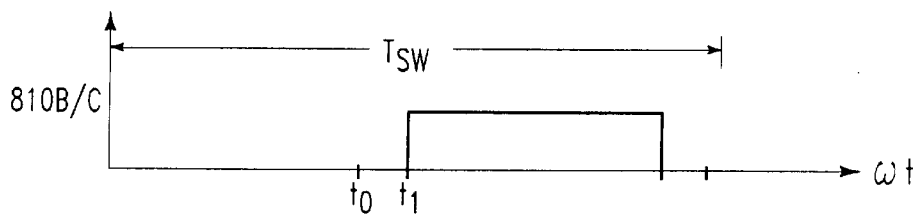
Figure 6C:
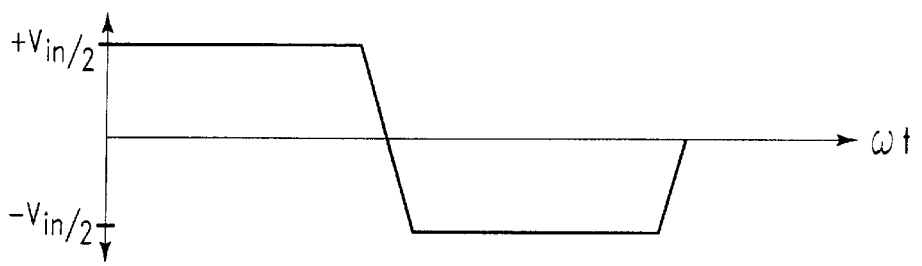
Figure 6D:
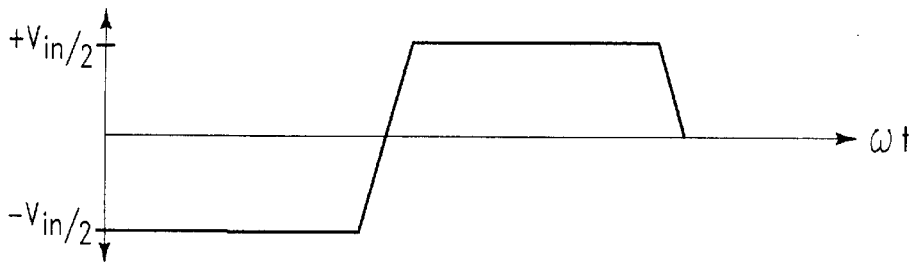
Figure 6E:
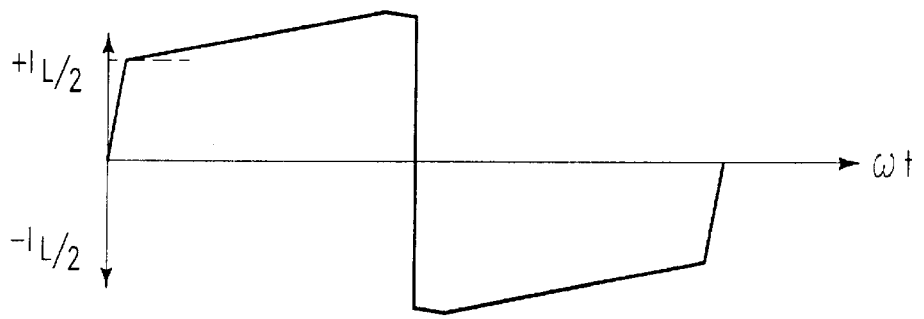
Figure 6F:
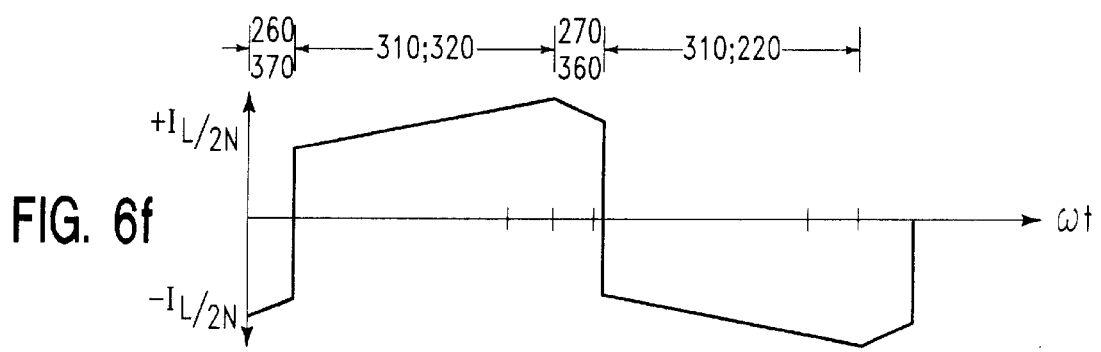

The gate switching pulses 810*a*, 810*b*, 810*c*, and 810*d* applied to the gates of MOSFETs 210, 220, 310 and 320, respectively, from the controller 800 are shown in FIGS. 6(*a*) and 6(*b*). Neglecting the small deadtime (i.e., from t$_0$ to t$_1$) between the two complementary switches of the first and second switching networks 200 and 300, respectively, the phase angle φ between the two switching networks 200 and 300 is the angle between the gating pulses of 810*a* and 810*c* or 810*b* and 810*d* as shown in FIGS. 6(*a*) and 6(*b*). When operating under the full-load condition, the first and second switching networks are 180 degrees out-of-phase. Knowing the gating pulses and, knowing that the common node 430 between capacitors 410 and 420 is at a potential of $$\frac{V_{in}}{2},$$

the voltage across the primary winding 615 of the first transformer 510 is a square wave between $$\frac{+V_{in}}{2}$$

and $$\frac{-V_{in}}{2}$$

shown in FIG. 6(*c*). Similarly, the voltage across the primary winding 525 of the second transformer 520 is a square wave between $$\frac{+V_{in}}{2}$$

and $$\frac{-V_{in}}{2}$$

as shown in FIG. 6(*d*). The secondaries of the first and second transformers 510 and 520 are connected in series to provide the output voltage before the rectifier/filter 600 as shown in FIG. 6 (*i*). Assuming that the current through the inductors 630 and 640 of the current doubler is constant, the value of the current flowing through the inductor 630 or 640 is given by $$\frac{I_L}{2}$$

where I$_L$ is the load current. Therefore the current flowing through the secondaries of the transformers 510 and 520 is a square wave between $$\frac{+I_L}{2}$$

and $$\frac{-I_L}{2}$$

as shown in FIG. 6 (*e*). Based on these known currents through the secondaries of the first and second transformers 510 and 520, the current through the primary 515 of the first transformer 510 is $$\frac{I_s}{N},$$

a square wave between $$\frac{+I_L}{2N}$$

and $$\frac{-I_L}{2N}$$

as shown in FIG. 6(f) where $I_s$ is the transformer secondary current and N is the turns ratio which is given by $$N = \frac{V_{prim}}{V_{sec}} = \frac{I_{sec}}{I_{prim}}.$$

The same current flows through the primary 515 of the first transformer 510 and the primary 525 of the second transformer because of the connection of their respective secondaries. Moreover, the current flowing through the transistors (210, 220, 310 and 320) is the sum of the current through the primary of the respective transformer 510 or 520 and the current through the Irrespective of the phase angle φ between the two switching signals applied to the first and second switching networks 200 and 300, respectively, the voltage across the inductor 24 is a square wave between $$\frac{+V_{in}}{2}$$

and $$\frac{-V_{in}}{2}$$

as shown in FIG. 6(c). Therefore the current ($I_{L1}$) through the inductor 23 is given by (neglecting the deadtime between MOSFETs 210 and 220):

$$\frac{L_1 dI_{L1}}{dt} = \frac{V_{in}}{2} \quad 0 < t < t_1 \quad (1)$$

$$\frac{dI_{L1}}{dt} = \frac{V_{in}}{2L_1} \quad (2)$$

$$I_{L1}(t) = \frac{V_{in}}{2L_1} t + C \quad 0 < t < t_1 \quad (3)$$

Figure 6G:
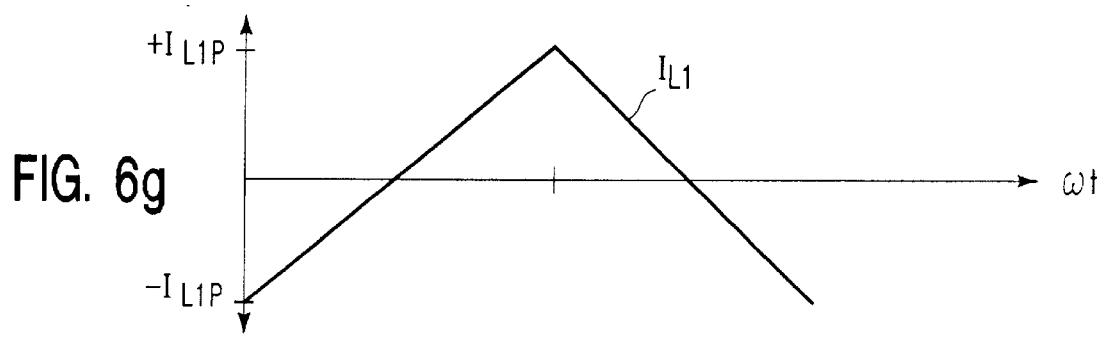
Figure 6H:
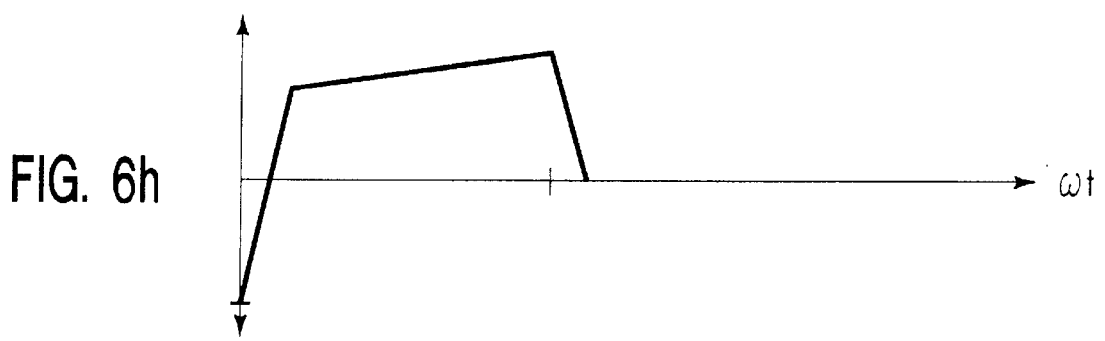
Figure 6I:
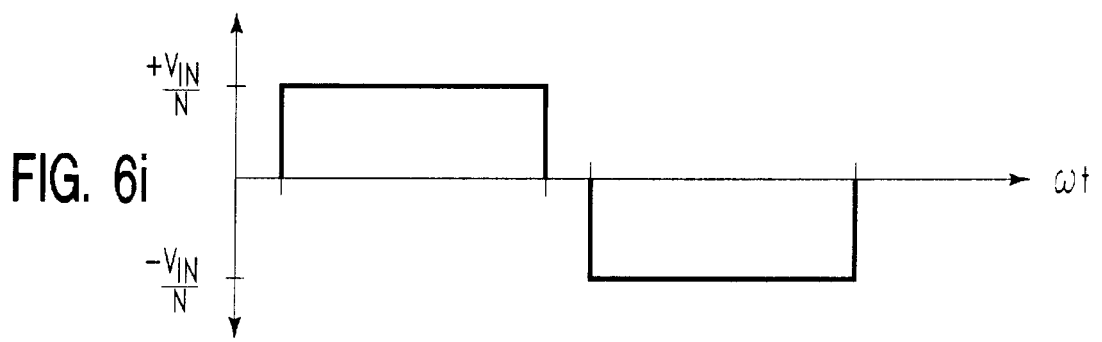

Having applied a square wave between $$\frac{+V_{in}}{2}$$

and $$\frac{-V_{in}}{2}$$

across the inductor 24, the current ($I_{L1}$) through the inductor 24 at t=0 ($I_{L1}(0)$ is the current ($-I_{L1peak}$). Substituting this initial condition into equation (3), the current ($I_{L1}$) through inductor 24 is given by equation (4) and is shown in FIG. 6(g).

$$I_{L1} = \frac{V_{in}}{2L_1} t - I_{L1peak} \quad 0 < t < t_1 \quad (4)$$

The value of $I_{L1peak}$ is given by:

$$I_{L1peak} = \frac{V_{in}}{2L_1} * \frac{T_{SW}}{4} = \frac{V_{in}T_{SW}}{8L_1} \quad (5)$$

where $T_{SW}$ is the time period of the switching signals applied to the first and second switching networks 200 and 300, respectively. Substituting equation (5) into equation (4) permits the current ($I_{L1}$) through the inductor 24 to be determined. Thus, the current $I_{210}(t)$ through the MOSFET (210) is given by equation (6) and shown in FIG. 6(h).

$$I_{210}(t) = \frac{I_L}{2N} + \frac{V_{in}}{2L_1} t - \frac{V_{in}T_{SW}}{8L_1} \quad 0 < t < t_1 \quad (6)$$

The current through the inductor 34 and other transistors (220, 310 and 320) can be similarly derived.

Thusfar, we have described the currents through the major components of our power converter. The turn-on and turn-off behavior of the transistor (210) will be described below.

As shown in FIGS. 5 and 6(a), at time to, when the MOSFET 210 is being turned-off by an appropriate control signal 810a from the control circuit 800, the current ($I_{210}(t_1)$) flowing through the MOSFPT 210 (see Equation (6) above) now starts flowing through the capacitor 230 making the voltage across the MOSFET 210 zero during turn-off. Hence zero voltage turn-off of the MOSFET 210 is accomplished as shown in FIG. 6(f).

Before turning-off the MOSFET 210, the voltage across the MOSFET 220 is equal to $V_{in}$ and capacitor 240 is charged to $V_{in}$. As the current flowing through the capacitor 230 increases, the voltage across the capacitor 230 increases and the voltage across the capacitor 240 decreases such that the total voltage across capacitors 230 and 240 will always be equal to $V_{in}$. Assuming a constant current flowing through the capacitor 230 during turn-off of the MOSFET 210, the voltage across the MOSFET 210 rises at a rate of:

$$\frac{dV_{210}}{dt} = \frac{I_{210}(t_0)}{C_{230}} \quad (7)$$

Since the load current ($I_L$), the inductance ($L_1$) of inductor 24, and the switching period $T_{sw}$ are known, the value of the current $I_{210}(t_1)$ through the MOSFET 210 can be calculated from equation (6) above. Furthermore, the time to charge the capacitor 230 from 0 to $V_{in}$ for any given value of capacitor 230 can be calculated using equation (7) above. As the charge on the capacitor 230 reaches $V_{in}$, the diode 270 becomes forward biased and the current of the primary 515 of the first transformer 510 and of the inductor 24 is transferred to diode 270. The load current ($I_L$) is transiently maintained by the leakage inductance of the transformer 510. As the diode 270 conducts, the MOSFET 220 is turned-on by the control circuit 800. As shown in FIG. 6(f), at the end of diode 270 conduction, the currents $I_{L1}$ and $I_{TP1}$ are transferred to the MOSFET 220. Hence zero voltage turn-on of the MOSFET 220 is accomplished. Similar conditions will reappear for other switches during turn-on and turn-off at full load.

Operation at a Mid-Level (Switching Networks 90 Degrees Out-Of-Phase)

The operation of our power converter when the phase difference between the switching signals applied to the first and second switching networks 200 and 300, respectively, is 90 degrees, is described in the following with reference to FIG. 5 and FIGS. 7 (a) through 7(i). The switching control pulses 810a, 810b, 810c, and 810d applied to the gates of the MOSFETs 210, 220, 310, 320, respectively, are shown in FIGS. 7 (a) through 7 (d). Considering the instant at which the MOSFETs 210 and 320 are conducing, at time t=t$_1$, the MOSFET 320 is turned-off by its appropriate control signal 810d. The current flowing through the MOSFET 320 now starts flowing through the capacitor 340 and charges the capacitor 340 to $V_{in}$ while simultaneously discharging the capacitor 330 from $V_{in}$ to zero volts as explained in earlier section. During this period, the current flowing through the current doubling inductors 630 and 640 maintains constant current by freewheeling the current through the secondaries of transformers 510 and 520. When the capacitor 330 is completely discharged, the diode 360 becomes forward biased and the reflected primary current starts circulating through the MOSFET 210, the first and second transformers 510 and 520, respectively, and the diode 360. Thus, zero voltage is turn-on of 310 and zero voltage turn-off of 320 is achieved. As the local current is freewheeling through the secondaries of the first and second transformers 510 and 520, respectively, the primary current circulates through MOSFET 210 and diode 360 and a very small voltage (forward drop of MOSFET and diode) is available for decay of the current and the load current ($I_L$) is maintained by the leakage inductance of the first and second transformers. However, the current ($I_{L2}$) through the inductor 34 is the same as the current ($I_{L1}$) through the inductor 24 except that it is phase shifted appropriately as shown in FIG. 7(g). The currents through the primary winding 525 of the second transformer 520 and the MOSFET 320 are shown in FIGS. 7(h) and 7(i). The zero voltage turn-off of the MOSFET 320 occurs as explained above with reference to full-load operation.

Figure 7A:
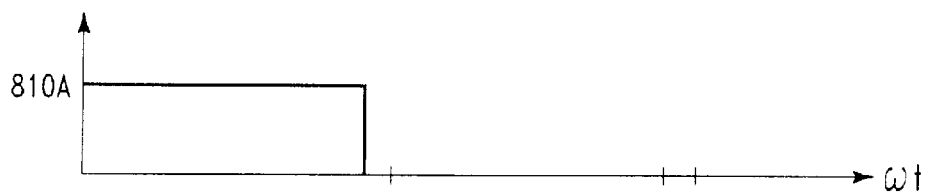
FIGS. 7(a) through 7(i) are timing diagrams which illustrate the operation of our power converter of FIG. 5 when the phase difference between the two switching networks is 90 degrees.
Figure 7B:
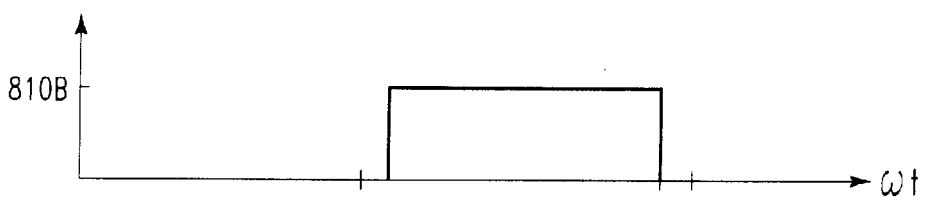
Figure 7C:
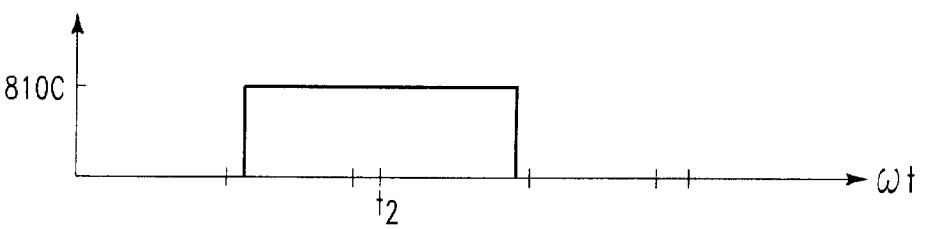
Figure 7D:
Figure 7E:
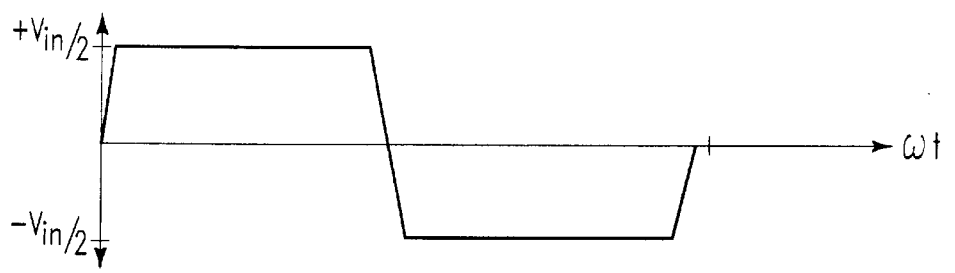
Figure 7F:
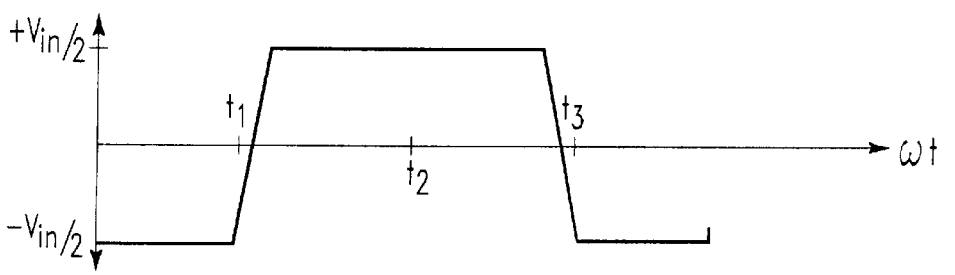
Figure 7G:
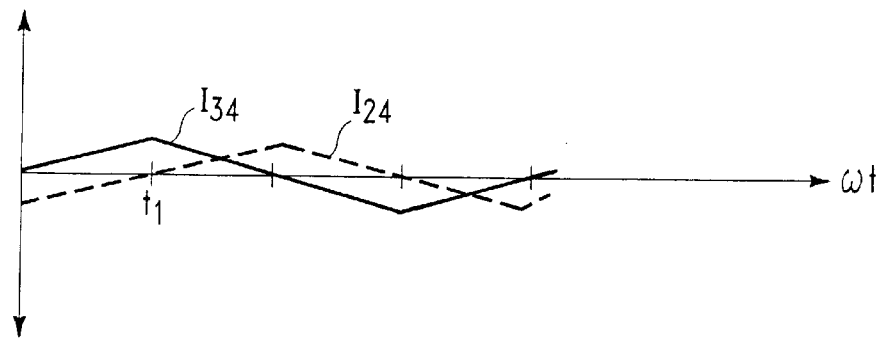
Figure 7H:
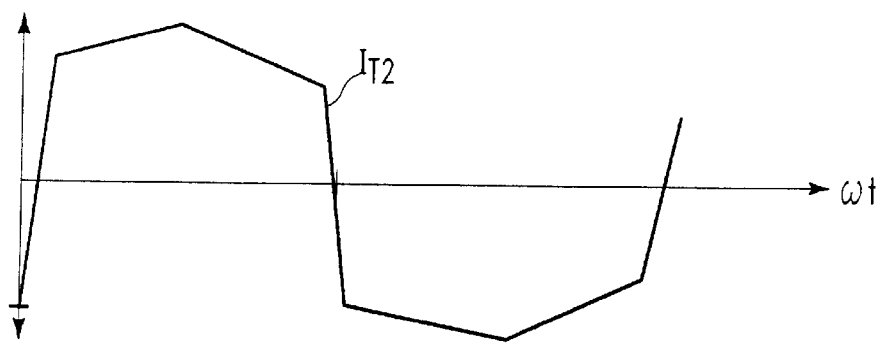
Figure 7I:
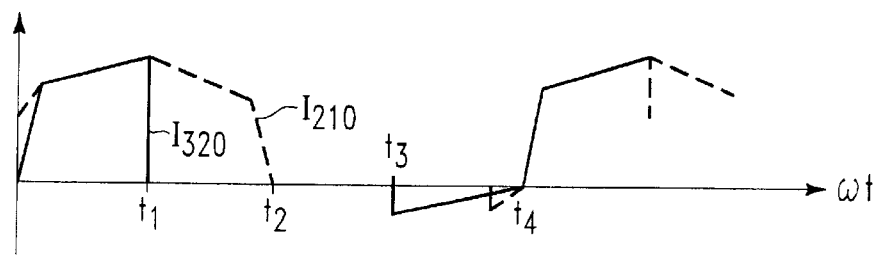

At the end of this circulation period, the MOSFET 210 is turned-off by its control signal 810a (FIG. 7(a)) and the cycle repeats by transferring the entire current flowing through the MOSFET 210 to the MOSFET 220 by following the zero voltage turn-off of the MOSFET 210 and zero voltage turn-on of the MOSFET 220 as explained earlier.

Thurfar, the operation of our power converter has been described when the phase difference between the first and second switching networks 200 and 300, respectively, is 90° and 180°. However at no load, the circulating current becomes zero and the phase difference between the two switching networks is zero, and zero voltage turn-on and turn-off of the MOSFETs 210, 220, 310, and 320 is achieved, althoug not in the same way as at full load. The following section describes the operation of our power converter at no load.

Operation at No Load

Figure 8A:
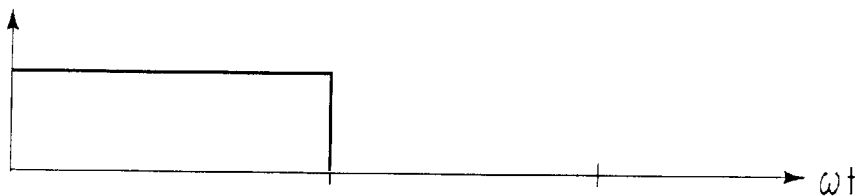
FIGS. 8(a) through 8(c) are timing diagrams which illustrate the operation of our power converter of FIG. 5 during no load operation where the two switching networks operate in-phase with one another.
Figure 8B:
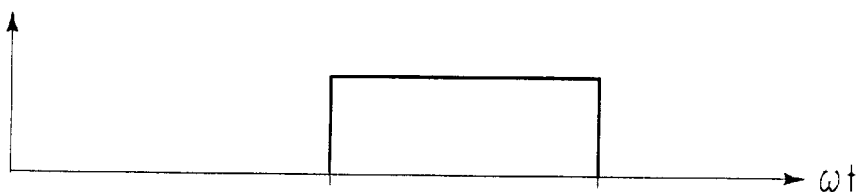
Figure 8C:
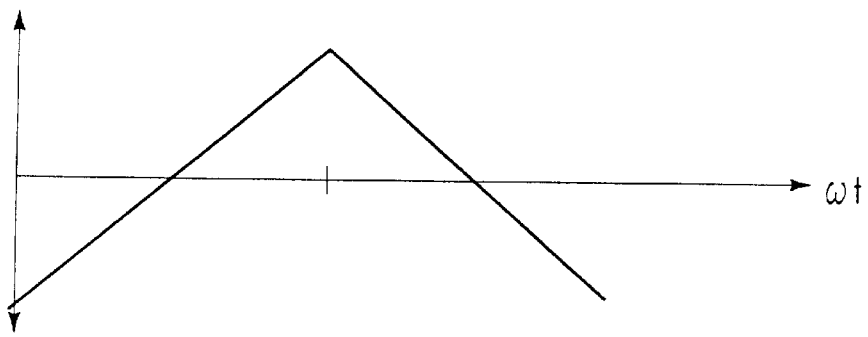

At no load, the switching signals 810a, 810b, 810c, and 810d applied to the gates of MOSFETs 210, 220, 310 and 320, respectively, are shown in FIGS. 8(a) and 8(b) and the load current ($I_L$) is zero. Assuming the magnetizing current of the first and second transformers is 5% of the load current $I_L$, the current flowing through the primaries 515 and 525 of the first and second transformers 510 and 520, respectively, is 0.05*$I_L$. In earlier cases, the magnetizing current of the transformers is assumed to be zero since it is very small compared to load current. Therefore the current flowing through the MOSFET 210 at no load is the current ($I_{L1}$) flowing through the inductor 24. Substituting $I_L$=0 into equation (6) above, the value of current ($I_{210}$) flowing through the MOSFET 210 is given by:

$$I_{210}(t) = \frac{V_{in}}{2L_1} t - \frac{V_{in}T_{SW}}{8L_1} \quad 0 < t < t_1 \quad (8)$$

The value of the current ($I_{210}$) through the MOSFET 210 at time $t_1$ just before turning-off is given by:

$$I_{210P}(t_1) = \frac{V_{in}T_{SW}}{8L_1} + \frac{0.05I_L}{2N} \quad (9)$$

at time $t_1$. When the MOSFET 210 is turned-off, the current $I_{210}$ flowing through the MOSFET 210 now starts flowing through the capacitor 230 and resonates with a frequency determined by capacitor 230 and the inductor 24. The current $I_{230}$ flowing through capacitor 230 and the inductor 24 is given by:

$$I_{230}(t)=A \sin \omega t+B \cos \omega t \quad (10)$$

Substituting the initial inductor current $I_{L1}$=$I_{210P}(t_1)$ and initial capacitor 230 voltage=0, the current $I_{230}$ through capacitor 230 is given by:

$$I_{230}(t) = \left[ \left( \frac{0.05I_L}{2N} \right) + \left( \frac{V_{in}T_{SW}}{8L_1} \right) \right] * \cos\omega_r t \quad (11)$$

Where $$\omega_r = \sqrt{\frac{1}{L_1 * C_{230}}} \quad (12)$$

Based on a switching frequency of 100 KHz, the maximum allowable time for a snubber capacitor 230 to charge to $V_{IN}$ is 300 ns. The frequency $\omega_r$ is fairly close to the angular switching frequency of the converter. Using equation (7), the voltage across the MOSFET 210 is:

$$\frac{dV_{210}}{dtt} \text{ (no load)} = \frac{I_{210P}(t_1)\text{(no load)}}{C_{230}} \quad (13)$$

Using equation (13) above, the value of snubber capacitor $C_{230}$ is given by (assuming the change in current during 300 ns is negligible):

$$C_{230} = \frac{\left( \frac{V_{in}T_{SW}}{8L_1} + \frac{0.05I_L}{2N} \right)}{V_{in}} * 300 * 10^{-9} \quad (14)$$

The other MOSFETs 220, 310 and 320 will experience similar conditions during the subsequent interval.

Once the capacitor 230 charges to $V_{in}$ in 300 ns, the anti-parallel diode 270 of its complementary switch 220 in the first switching network 200 becomes forward biased and freewheels the inductor $L_1$ current during the freewheeling period. Hence, zero voltage turn-off of MOSFET 210 and zero voltage turn-on of MOSFET 220 are accomplished.

Figure 12:
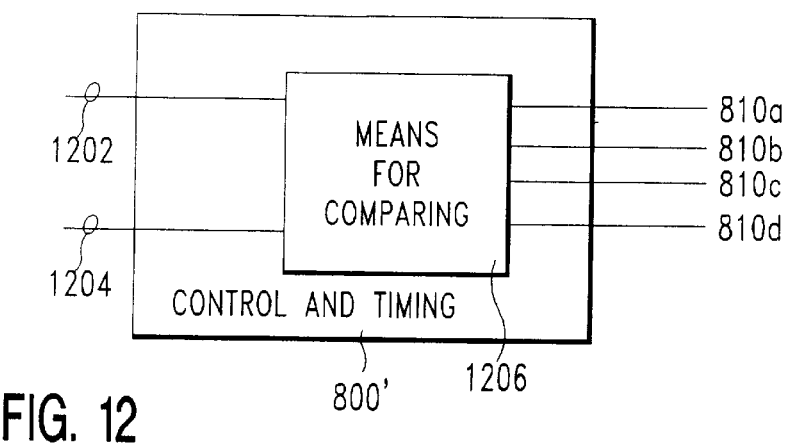
FIG. 12 is a block diagram of a portion of the control and timer circuits of FIGS. 5 and 9.

A detector 700 may be used to provide a feedback signal to a control and timer circuit 800 which adjusts the relative phases of the switching signals 810a, 810b, 810c, and 810d, applied to MOSFETs 210, 220, 310, and 320, respectively, accordingly. As shown in FIG. 12, the control and timer 800 may include a means 1206 for comparing the feedback signal 1202 with a set-point value 1204.

Figure 9:
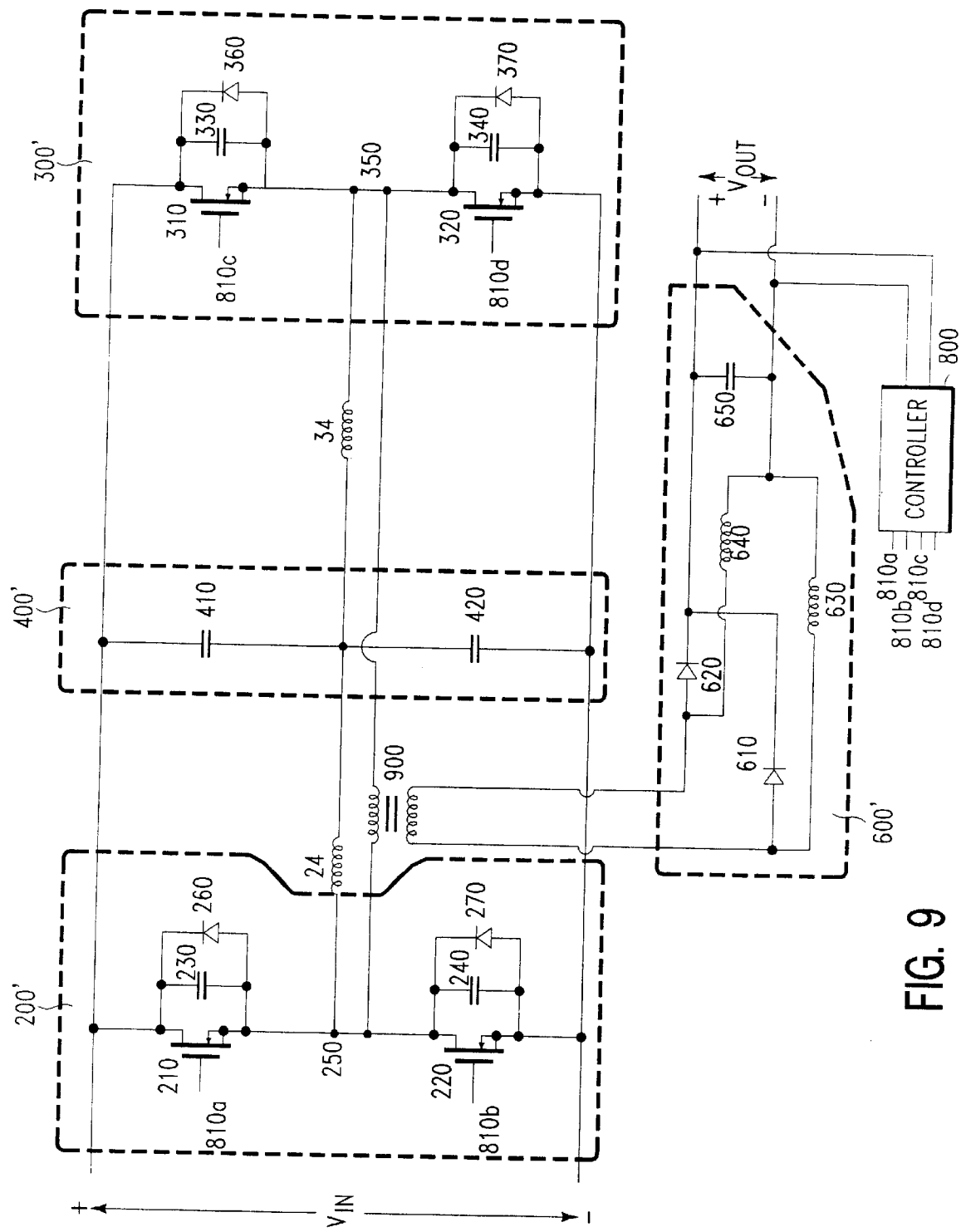
FIG. 9 is a schematic of an alternative power converter of the present invention which is implemented with a single transformer.

FIG. 9 is a schematic of an alternative embodiment of the present invention which uses a single transformer 900 arranged between switching junctions 250 and 350 rather than two separate transformers 510 and 520, each arranged between a switching junction 250 or 350, and the node 430 of the voltage divider circuit 400. Zero voltage turn-on and turn-off of the MOSFETs occur in a manner similar to that described above with reference to FIG. 5.

What is claimed is:

1. An apparatus for converting an input DC voltage from an input DC voltage source to a DC output voltage supplied to a load, the apparatus comprising:

a divider circuit comprising two capacitors connected in series thereby defining a node therebetween, the divider circuit being coupled in parallel with the input DC voltage source;

first and second switching networks, each switching network having an output junction, a first path for carrying load current and arranged between the output it junction and a positive side of the input DC voltage source, a second path for carrying load current and arranged between the output junction and a negative side of the input DC voltage source, the first and second paths each having a blocking state and a conducting state and each having a control input, wherein the respective states of the first and second paths are selected based on a control signal applied to the respective control inputs;

a first and second power transformer, each transformer having at least one primary winding and at least one secondary winding, each winding having a polarity, the primary winding of the first transformer connected between the output junction of the first switching network and the node of the divider circuit, the primary winding of the second transformer connected between the output junction of the second switching network and the node of the divider circuit, the secondary windings of the first and second transformers connected in series with each other thereby forming a transformer secondary circuit having two end terminals;

a voltage rectifier coupled with the two end terminals of the transformer secondary circuit and providing the output DC voltage; and a controller coupled between the voltage rectifier and the control inputs of the first and second devices of the first switching network and the third and fourth devices of the second switching network, wherein the controller responsively shifts a phase relationship of the first and second switching networks to maintain the output voltage of the output DC voltage source at a selected level, wherein, a relative phase between a current induced on the secondary winding of the first transformer and a current induced on the secondary winding of the second transformer affects the DC output voltage such that the DC output voltage varies with respect to a fixed voltage of the node of the divider circuit when the relative phase is varied.

2. The apparatus of claim 1 wherein the controller includes a voltage sensor for sensing the output DC voltage provided by the rectifier.

3. An apparatus for converting an input DC voltage from an input DC voltage source to a DC output voltage supplied to a load, the apparatus comprising:

a divider circuit comprising two capacitors connected in series thereby defining a node therebetween, the divider circuit being coupled in parallel with the input DC voltage source;

first and second switching networks, each switching network having an output junction, a first path for carrying load current and arranged between the output junction and a positive side of the input DC voltage source, a second path for carrying load current and arranged between the output junction and a negative side of the input DC voltage source, the first and second paths each having a blocking state and a conducting state and each having a control input, wherein the respective states of the first and second paths are selected based on a control signal applied to the respective control inputs;

a first and second power transformer, each transformer having at least one primary winding and at least one secondary winding, each winding having a polarity, the primary winding of the first transformer connected between the output junction of the first switching network and the node of the divider circuit, the primary winding of the second transformer connected between the output junction of the second switching network and the node of the divider circuit, the secondary windings of the first and second transformers connected in series with each other thereby forming a transformer secondary circuit having two end terminals;

a voltage rectifier coupled with the two end terminals of the transformer secondary circuit and providing the output DC voltage;

a controller coupled between the voltage rectifier and the control inputs of the first and second devices of the first switching network and the third and fourth devices of the second switching network, wherein the controller responsively shifts a phase relationship of the first and second switching networks to maintain the output voltage of the output DC voltage source at a selected level; and a first inductor coupled between the output junction of the first switching network and the node of the divider circuit and a second inductor coupled between the output junction of the second switching network and the node of the divider circuit.

4. An apparatus for converting an input DC voltage from an input DC voltage source having a first terminal and a second terminal, to an output voltage, the apparatus comprising:

a) a divider circuit, the divider circuit
  i) including a first capacitor and a second capacitor coupled in series thereby defining a node therebetween, and
  ii) coupled across the first and second terminals of the input DC voltage source;

b) a first switching network, the first switching network
  i) coupled across the first and second terminals of the input DC voltage source,
  ii) having an output node,
  iii) having a first device having a conducting state for creating a current path between the first terminal of the input voltage source and the output node, and a blocking state, the first device having an input terminal for receiving a first control signal which determines whether the first device is in its conducting state or its blocking state, and
  iv) having a second device having a conducting state for creating a current path between the second terminal of the input voltage source and the output node and a blocking state, the second device having an input terminal for receiving a second control signal which determines whether the second device is in its conducting state or its blocking state;

c) a second switching network, the second switching network
  i) coupled across the first and second terminals of the input DC voltage source,
  ii) having an output node,
  iii) having a third device having a conducting state for creating a current path between the first terminal of the input voltage source and the output node of the second switching network, and a blocking state, the third device of the second switching network having an input terminal for receiving a third control signal which determines whether the third device of the second switching network is in its conducting state or its blocking state, and
  iv) having a fourth device having a conducting state for creating a current path between the second terminal of the input voltage source and the output node of the second switching network, and a blocking state, the fourth device of the second switching network having an input terminal for receiving a fourth control signal which determines whether the fourth device of the second switching network is in its conducting state or its blocking state;
d) a transformer, the transformer
  i) having a primary winding coupled between the output node of the first switching network and the output node of the second switching network, and
  ii) having a secondary winding inductively coupled with the primary winding, the secondary winding having a first terminal node and a second terminal node;
e) a first inductor coupled between the output node of the first switching network and the node of the divider circuit; and
f) a second inductor coupled between the output node of the second switching network and the node of the divider circuit,
wherein the output voltage appears across the first and second terminal nodes.

5. The apparatus of claim 4 further comprising:
f) a rectifier coupled with the first terminal node and the second terminal node of the secondary winding and providing an output DC voltage; and
g) a controller, the controller
  i) having an input coupled with the output DC voltage, and
  ii) providing the first, second, third, and fourth control signals to the input terminals of the first and second devices of the first switching network and the third and fourth devices of the second switching network, respectively, based on a comparison of the output DC voltage with a setpoint DC output voltage.

6. An apparatus for converting an input DC voltage from an input DC voltage source having a first terminal and a second terminal, to an output voltage, the apparatus comprising:
a) a divider circuit, the divider circuit
  i) including a first capacitor and a second capacitor coupled in series thereby defining a node therebetween, and
  ii) coupled across the first and second terminals of the input DC voltage source;
b) a first switching network, the first switching network
  i) coupled across the first and second terminals of the input DC voltage source,
  ii) having an output node,
  iii) having a first device having a conducting state for creating a current path between the first terminal of the input voltage source and the output node, and a blocking state, the first device having an input terminal for receiving a first control signal which determines whether the first device is in its conducting state or its blocking state, and
  iv) having a second device having a conducting state for creating a current path between the second terminal of the input voltage source and the output node and a blocking state, the second device having an input terminal for receiving a second control signal which determines whether the second device is in its conducting state or its blocking state;
c) a second switching network, the second switching network
  i) coupled across the first and second terminals of the input DC voltage source,
  ii) having an output node,
  iii) having a third device having a conducting state for creating a current path between the first terminal of the input voltage source and the output node of the second switching network, and a blocking state, the third device of the second switching network having an input terminal for receiving a third control signal which determines whether the third device of the second switching network is in its conducting state or its blocking state, and
  iv) having a fourth device having a conducting state for creating a current path between the second terminal of the input voltage source and the output node of the source switching network, and a blocking state, the fourth device of the second switching network having an input terminal for receiving a fourth control signal which determines whether the fourth device of the second switching network is in its conducting state or its blocking state;
d) a first transformer, the first transformer
  i) having a primary winding coupled between the output node of the first switching network and the node of the divider circuit, and
  ii) having a secondary winding inductively coupled with the primary winding;
e) a second transformer, the second transformer
  i) having a primary winding coupled between the output node of the second switching network and the node of the divider circuit, and
  ii) having a secondary winding inductively coupled with the primary winding of the second transformer, the secondary winding of the second transformer connected in series with the secondary winding of the first transformer thereby forming a series connection of secondary windings having a first terminal node and a second terminal node,
wherein the output voltage appears across the first and second terminal nodes; and
f) a first inductor coupled between the output node of the first switching network and the node of the divider circuit and a second inductor coupled between the output node of the second switching network and the node of the divider circuit.

7. An apparatus for converting an input DC voltage from an input DC, voltage source having a first terminal and a second terminal, to an output voltage, the apparatus comprising:
a) a divider circuit, the divider circuit
  i) including a first capacitor and a second capacitor coupled in series thereby defining a node therebetween, and
  ii) coupled across the first and second terminals of the input DC voltage source;
b) a first switching network, the first switching network
  i) coupled across the first and second terminals of the input DC voltage source,
  ii) having an output node,
  iii) having a first device having a conducting state for creating a current path between the is first terminal of the input voltage source and the output node, and a blocking state, the first device having an input terminal for receiving a first control signal which determines whether the first device is in its conducting state or its blocking state, and
  iv) having a second device having a conducting state for creating a current path between the second terminal of the input voltage source and the output node and a blocking state, the second device having an input terminal for receiving a second control signal which determines whether the second device is in its conducting state or its blocking state;

c) a second switching network, the second switching network
   i) coupled across the first and second terminals of the input DC voltage source,
   ii) having an output node,
   iii) having a third device having a conducting state for creating a current path between the first terminal of the input voltage source and the output node of the second switching network, and a blocking state, the third device of the second switching network having an input terminal for receiving a third control signal which determines whether the third device of the second switching network is in its conducting state or its blocking state, and
   iv) having a fourth device having a conducting state for creating a current path between the second terminal of the input voltage source and the output node of the second switching network, and a blocking state, the fourth device of the second switching network having an input terminal for receiving a fourth control signal which determines whether the fourth device of the second switching network is in its conducting state or its blocking state;

d) a first transformer, the first transformer
   i) having a primary winding coupled between the output node of the first switching network and the node of the divider circuit, and
   ii) having a secondary winding inductively coupled with the primary winding;

e) a second transformer, the second transformer
   i) having a primary winding coupled between the output node of the second switching network and the node of the divider circuit, and
   ii) having a secondary winding inductively coupled with the primary winding of the second transformer, the secondary winding of the second transformer connected in series with the secondary winding of the first transformer thereby forming a series connection of secondary windings having a first terminal node and a second terminal node, wherein the output voltage appears across the first and second terminal nodes, and wherein a relative phase between a current induced on the secondary winding of the first transformer and a current induced on the secondary winding of the second transformer affects the output voltage appearing across the first and second terminal nodes such that the output voltage varies with respect to a fixed voltage of the node of the divider circuit when the relative phase is varied.

8. The apparatus of claim 7 wherein each of the first and second devices of the of the first switching network and the third and fourth devices of the second switching network includes a controllable switch and wherein the output node of the first switching network is formed between the first and second devices of the first switching network and the output node of the second switching network is formed between the third and fourth devices of the second switching network.

9. The apparatus of claim 8 wherein each of the controllable switches includes a MOSFET having a gate serving as the input terminal.

10. The apparatus of claim 8 wherein each of the first and second devices of the first switching network and the third and fourth devices of the second switching network include a resonant tank circuit connected across its controllable switch.

11. The apparatus of claim 10 wherein each of the resonant tank circuits includes a capacitor with an anti-parallel diode.

12. The apparatus of claim 7 further comprising:
f) a rectifier coupled with the first terminal node and the second terminal node of the series connection of the secondary windings and providing an output DC voltage; and
g) a controller, the controller
   i) having an input coupled with the output DC voltage, and
   ii) providing the first, second, third, and fourth control signals to the input terminals of the first and second devices of the first switching network and the third and fourth devices of the second switching network, respectively, based on a comparison of the output DC voltage with a setpoint DC output voltage.

13. The apparatus of claim 12 wherein the rectifier includes a filtering device.

14. The apparatus of claim 12 wherein the controller provides the first, second, third, and fourth control signals in a sequence of eight states wherein, in a first of the eight states, each of the first device of the first switching network and the fourth device of the second switching network is in its conducting state and each of the second device of the first switching network and the third device of the second switching network is in its blocking state, in a second of the eight states, the first device of the first switching network is in its conducting state and each of the second device of the first switching network and the third and fourth devices of the second switching network is in its blocking state, in a third of the eight states, each of the first device of the first switching network and the third device of the second switching network is in its conducting state and each of the second device of the first network and the third and fourth devices of the second network is in its blocking state, in a fourth of the eight states, each of the first and second devices of the first switching network and the fourth device of the second switching network is in its blocking state and the third device of the second switching network is in its conducting state, in a fifth of the eight states, each of the first device of the first switching network and fourth device of the second switching network is in its blocking state and each of the second device of the first switching network and the third device of the second switching network is in its conducting state, in a sixth of the eight states, the second device of the first switching network is in its conducting state and each of the first device of the first switching network and the third and fourth devices of the second switching network is in its blocking state, in a seventh of the eight states, each of the first device of the first network and the third device of the second network is in its blocking state and each of the second device of the first network and the fourth device of the second network is in its conducing state, and in an eighth of the eight states, each of the first and second devices of the first switching network and the third device of the second switching network is in its blocking state and the fourth device of the second switching network is in its conducting state.

15. The apparatus of claim 12 wherein the first, second, third and fourth control signals are square waves having a duty cycle of less than 50%, wherein the first control signal is approximately 180° out of phase with the second control signal whereby the first and second devices of the first switching network cannot be in their conducting states simultaneously and wherein the third control signal is approximately 180° out of phase with the fourth control signal, whereby the third and fourth devices of the second switching network cannot be in their conducting states simultaneously.

16. The apparatus of claim 15 wherein the first, second, third and fourth control signals are provided at a fixed frequency.

17. The apparatus of claim 16 wherein the controller adjusts the first, second, third and fourth control signals based on the comparison of the output DC voltage with the setpoint DC output voltage by shifting the phases of the first and second signals with respect to the phases of the third and fourth signals, respectively.

18. The apparatus of claim 12 wherein the first and second switching networks are of a type selected from a group consisting of half-bridge inverters, full-bridge inverters, and push-pull inverters.

* * * * *